(12) United States Patent
Strieter et al.

(10) Patent No.: US 8,069,745 B2
(45) Date of Patent: Dec. 6, 2011

(54) POWER STEERING DEVICE INCLUDING A COMPLIANT GEAR

(75) Inventors: Troy P. Strieter, Sebewaing, MI (US); Anthony J. Champagne, Saginaw, MI (US)

(73) Assignee: Nexteer (Beijing) Technology Co., Ltd.

( * ) Notice: Subject to any disclaimer, the term of this patent is extended or adjusted under 35 U.S.C. 154(b) by 728 days.

(21) Appl. No.: 12/170,681

(22) Filed: Jul. 10, 2008

(65) Prior Publication Data

US 2010/0005914 A1    Jan. 14, 2010

(51) Int. Cl.
*F16H 1/16* (2006.01)
*F16H 55/18* (2006.01)
*F16D 3/00* (2006.01)

(52) U.S. Cl. .................. 74/425; 74/440; 464/73

(58) Field of Classification Search .......... 74/388 PS, 74/411, 425, 439, 440, 443, 446, 447, 89.14; 464/73, 74, 75, 76
See application file for complete search history.

(56) References Cited

U.S. PATENT DOCUMENTS

| | | | |
|---|---|---|---|
| 4,674,351 A | 6/1987 | Byrd | |
| 4,831,897 A | 5/1989 | Dobbs | |
| 5,178,026 A * | 1/1993 | Matsumoto | 74/411 |
| 5,307,705 A | 5/1994 | Fenelon | |
| 5,653,144 A | 8/1997 | Fenelon | |
| 5,692,410 A | 12/1997 | Fenelon | |
| 5,837,908 A | 11/1998 | Ng et al. | |
| 5,911,788 A | 6/1999 | Russ et al. | |
| 5,943,913 A | 8/1999 | Fenelon | |
| 5,956,998 A | 9/1999 | Fenelon | |
| 6,357,313 B1 | 3/2002 | Appleyard | |
| 6,520,042 B2 | 2/2003 | Jammer et al. | |

* cited by examiner

*Primary Examiner* — Thomas R Hannon
*Assistant Examiner* — Phillip A Johnson
(74) *Attorney, Agent, or Firm* — Cantor Colburn LLP

(57) ABSTRACT

A power steering device includes a first gear provided on the first shaft, the first gear having a centerline axis, and a second gear operatively connected to the first gear. The second gear includes a rotational axis that is maintained substantially coplanar with the centerline axis. The power steering device further includes a compliant member operatively connected with the second gear. The compliant member allows rotational compliance of the second gear while avoiding axial and radial compliance.

16 Claims, 3 Drawing Sheets

POWER STEERING DEVICE INCLUDING A COMPLIANT GEAR

BACKGROUND OF THE INVENTION

1. Field of the Invention

Exemplary embodiments of the invention relate to the art of power steering devices and, more particularly, to a power steering device having a compliant gear.

2. Description of Background

Electric Power Steering ("EPS") has been the subject of development by auto manufacturers and suppliers for well over a decade due in part to potential advantages of fuel economy and ease-of-control when compared with traditional hydraulic power steering ("HPS"). However, commercialization of EPS systems has been slow and is presently limited due to cost and performance challenges. Among the most challenging technical issues are a pulsating feel at the steering wheel and an audible noise associated with the type of high performance electric drives needed to meet steering requirements.

Current EPS systems experience rattle issues associated with motor inertia. Increased motor inertia causes high torque reversals along an intermediate shaft portion of the EPS when driving over bumps and the like. The high torque reversals give rise to rattles at various locations within the EPS system. Rattles develop in such locations as, worm-to-worm gear, EPS motor bearings, EPS motor-to-worm coupling, intermediate shaft cardan joints, rack-to-pinion teeth, rack-to-bushing, rack-yoke-to-housing and the like.

In order to reduce rattles, manufactures have added compliance to various components of the EPS. However, while compliant components can reduce unwanted noise, the compliant components often detract from steering "feel". Adding compliance to a steering shaft, for example, will certainly reduce unwanted noise, but will also provide a very soft steering "feel". In order to provide good steering "feel" and minimize unwanted noise, manufactures have added torsional and radial compliance to EPS worm and worm gear set. Unfortunately, when adding compliance to one or more worm gears, worm-worm alignment is affected. That is, the compliance creates a shifting of an axial alignment between the worm and the worm gear. In many cases, the shifting has no effect on steering. In other cases, axial alignment between components is important. For example, when using an enveloping worm gear, axial misalignment is not acceptable. Misalignment between enveloping worm gears can create binding and excessive component wear.

BRIEF DESCRIPTION OF THE INVENTION

In accordance with one exemplary embodiment of the invention a power steering device includes a first gear provided on the first shaft, the first gear having a centerline axis, and a second gear operatively connected to the first gear. The second gear includes a rotational axis that is maintained substantially coplanar with the centerline axis. The power steering device further includes a compliant member operatively connected with the second gear. The compliant member allows rotational compliance of the second gear while avoiding axial and radial compliance.

In accordance with another exemplary embodiment of the invention, an apparatus includes a worm having a centerline axis, and a worm gear operatively connected to the worm. The worm gear includes a rotational axis that is maintained substantially coplanar with the centerline axis. The worm gear includes a compliant member that allows rotational compliance of the worm gear while avoiding axial and radial compliance that would impact alignment between the rotational axis and centerline axis.

In accordance with yet another exemplary embodiment of the invention, an apparatus includes a worm gear having a compliant member that allows rotational compliance of the worm gear while avoiding axial and radial compliance.

Additional features and advantages are realized through the techniques of exemplary embodiments of the present invention. Other embodiments and aspects of the invention are described in detail herein and are considered a part of the claimed invention. For a better understanding of the invention with advantages and features thereof, refer to the description and to the drawings.

DETAILED DESCRIPTION OF THE INVENTION

Figure 1:
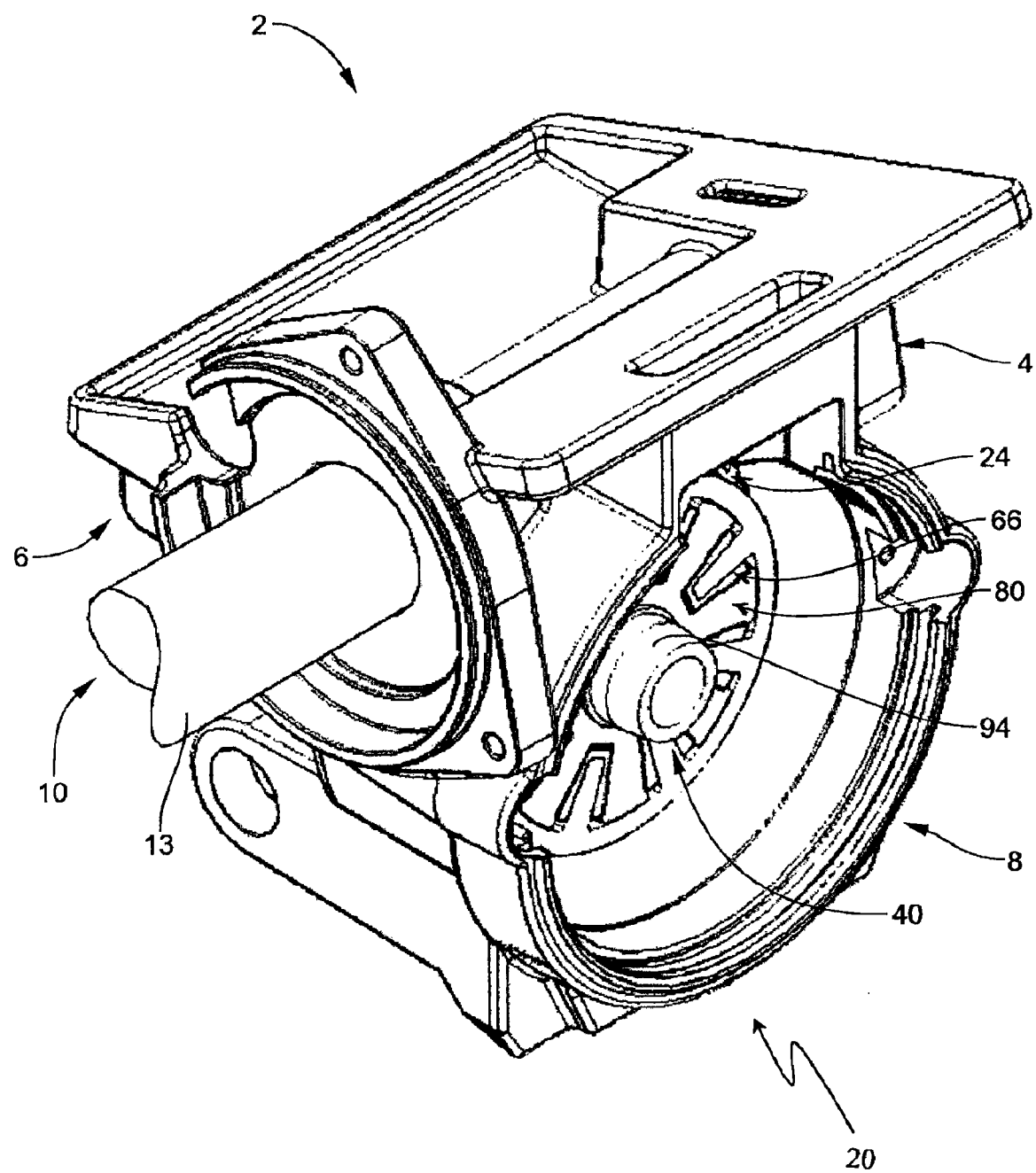
FIG. 1 is an upper right perspective view of a power steering device having a compliant member in accordance with an exemplary embodiment of the invention.
Figure 2:
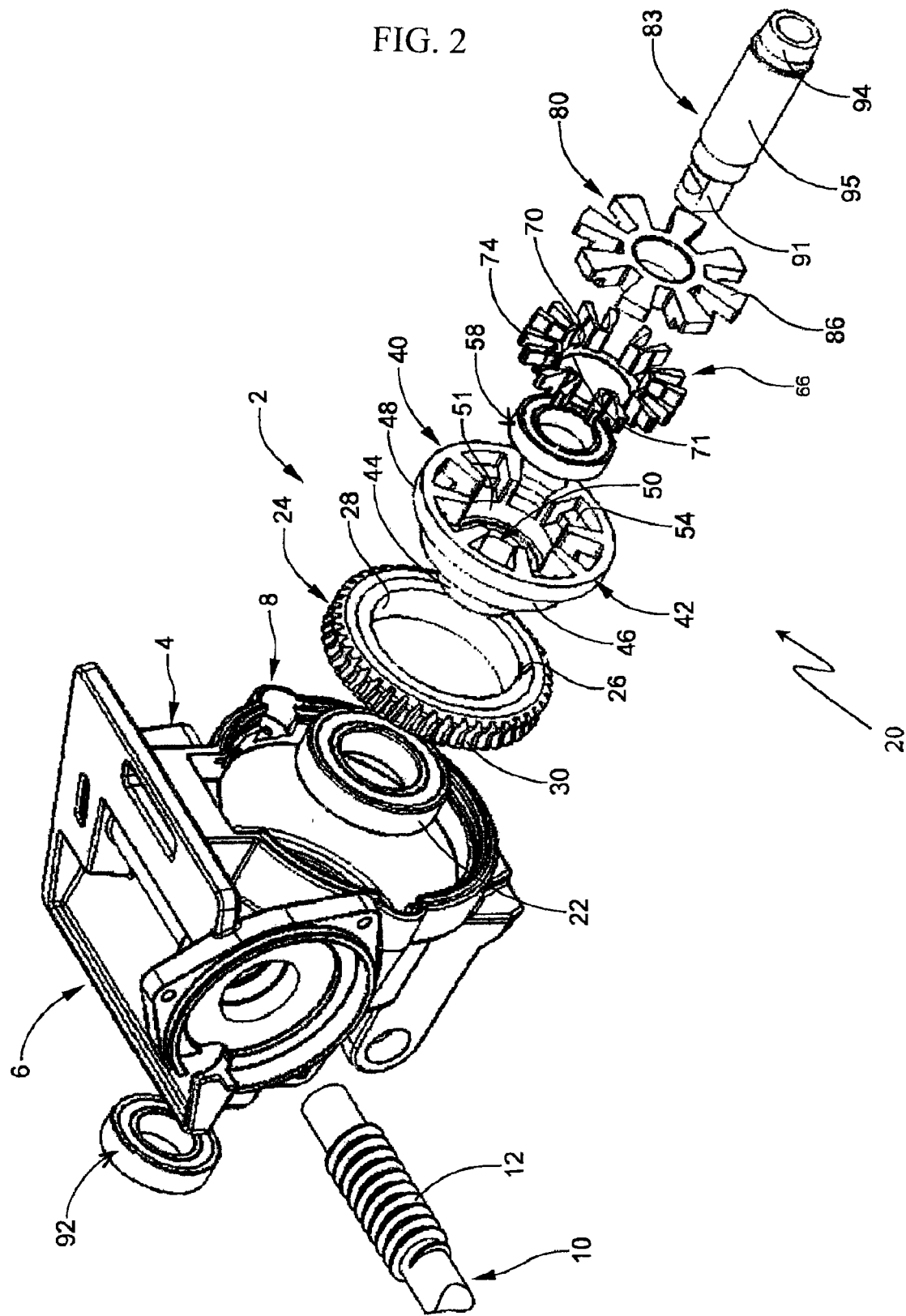
FIG. 2 is an exploded view of the power steering device of FIG. 1.
Figure 3:
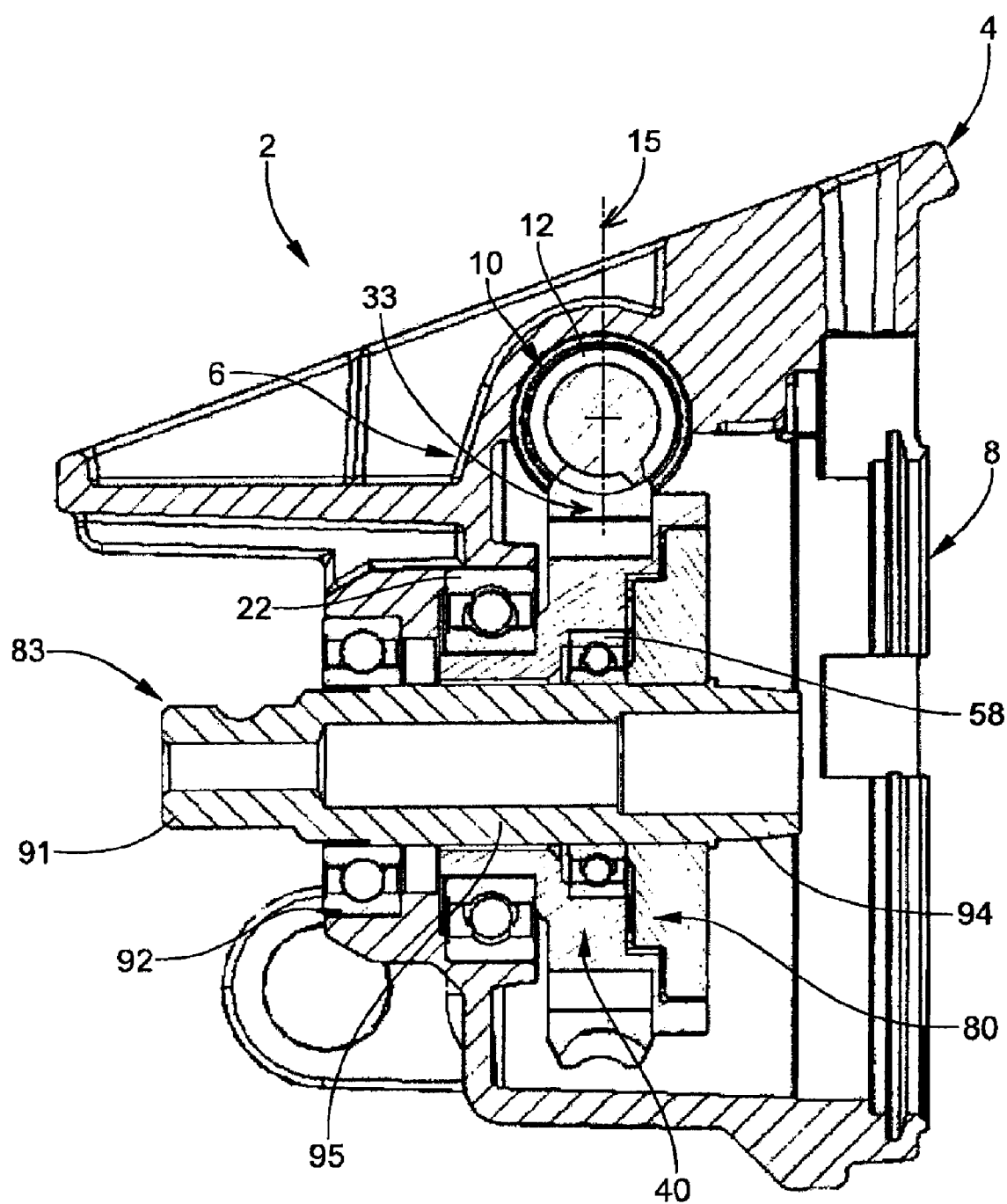
FIG. 3. is a cross-sectional right side view of the power steering device of FIG. 1.

With initial reference to FIGS. 1-3, a power steering device constructed in accordance with an exemplary embodiment of the invention is indicated generally at 2. In the exemplary embodiment shown, power steering device 2 forms part of an electric power steering (EPS) system, however, it should be understood that power steering device 2 can be employed in a wide array of power transmission applications. As shown, power steering device 2 includes a gear housing 4 having a worm portion 6 and a worm gear portion 8. Worm portion 6 includes a worm 10 which, in a manner known in the art, includes a screw or gear portion 12 (FIG. 2) formed on a shaft 13. Of course, it should be understood that screw or gear portion 12 could be integrally formed with shaft 13 or attached thereto. In any event, worm 10 includes a centerline axis 15 (FIG. 3) that projects through gear portion 12.

Worm gear portion 8 provides a housing for a worm gear assembly 20. Worm gear assembly 20 includes a drive element support bearing 22 that is press or slip fit into gear housing 4. Worm gear assembly 20 further includes a worm gear 24 having a main body portion 26 including an inner annular surface 28 and an outer, gear surface 30. In the exemplary embodiment shown, worm gear 24 takes the form of an enveloping worm type gear having a rotational axis 33 that is maintained substantially coplanar with centerline axis 15 of worm 10 in order to eliminate binding, wear and the like. A first drive element/inner hub 40 is fixably mounted to worm gear 24. Of course it should be understood that inner hub 40 and worm gear 24 could also be formed as a single component. In any event, inner hub 40 includes a main body 42 having a bearing land 44, a gear land 46 and an outer peripheral edge 48 that collectively define an interior portion 50. Bearing land 44 is supported by drive element support bearing 22 with gear land 46 providing an interface with worm gear 24. Inner portion 50 includes a bearing receiving section 51 and a plurality of recessed portions 54. Bearing receiving section 51 is configured to receive a shaft support bearing 58. Drive element support bearing 22 and shaft support bearing 58 enhance alignment of centerline axis 15 and rotational axis 33.

In further accordance with the exemplary embodiment shown, worm gear assembly 20 includes a compliant drive member 66. Compliant drive member 66 includes a central hub 70 having a central opening 71 and a plurality of ear members, one of which is indicated at 74. Compliant drive member 66 is formed from a resilient material that enables or allows approximately as low as a two (2) Newton-meter/degree, and up to very stiff, in the order of 100's of Newton-meter/degree stiffness upon being subjected to torque forces generated through steering device 2. Compliant drive member 66 comprises or in some cases is formed from visco-elastic materials such as, for example, but not limited to, silicone. However it should be understood that other compliant material can also be employed depending upon stiffness requirements, environmental requirements and durability requirements. In any event, compliant drive member 66 nests within or inner hub 40. That is, central hub 70 abuts shaft support bearing 58 with each of the plurality of ear members 74 extending into a corresponding one of the plurality of recessed regions 54. A second drive element 80 is operatably connected to compliant drive member 66 to transfer steering forces from a steering assist shift 83 to worm gear 24. That is, second drive element 80 is fixably mounted to steering assist shaft 83 and includes a plurality of lobe portions, one of which is indicated at 86, that nest within corresponding ones of the plurality of ear members 74. Of course, it should be understood that lobe portions 86 could take a variety of forms and geometries.

With this arrangement, steering forces transmitted through steering assist shaft 83 are transmitted to worm gear 24 with compliant drive member 66 serving as a force dampening element. More specifically, steering assistant shaft 83 is driveably coupled to worm gear 24. That is, steering assist shift 83 includes a first end portion 91 that passes through gear housing 4 and is supported by a first bearing 92. First end portion 91 extends to a second end portion 94 through a central or in intermediate portion 95 that is supported by shaft support bearing 58. With this configuration, a driver is provided with exceptional steering "feel" while, at the same time, compliant drive member 66 serves to decouple torque forces transmitted through steering device 2 as a result of bumps, and the like on the road. Moreover, compliant driver 66, by absorbing the torque forces generated by various road conditions eliminates or substantially reduces noise due to gear lash in steering device 2.

At this point, it should be appreciated that the present invention provides a system for reducing torque forces generated from a road, while at the same time, eliminating rattles or noises associated with gear lash in a steering device. In addition, the invention provides a system that reduces a magnitude of impacts to which the worm gear must react. Reduced energy from impacts improves an overall durability of the worm gear. Moreover, by providing the compliant drive member within the worm gear assembly, and utilizing shaft support bearing 58, center line to center line access of the worm to worm gear is maintained at all times. Thus, the present invention is particularly adaptable to gear configurations employing an enveloping worm gear. It should also be appreciated that the worm could include an inner compliant member that ensures that a rotational axis of the worm and a centerline axis of the worm gear remain substantially coplanar and still serve to decouple torque forces transmitted through steering device 2 as a result of bumps, and the like on the road.

In general, this written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of exemplary embodiments of the present invention if they have structural elements that do not differ from the literal language of the claims, or if they include equivalent structural elements with insubstantial differences from the literal language of the claims.

The invention claimed is:

1. A power steering device comprising:
   a first gear having a centerline axis;
   a second gear operatively connected to the first gear, the second gear having a rotational axis, the rotational axis being maintained substantially coplanar with the centerline axis; and
   a compliant member operatively connected with the second gear, the compliant member allowing rotational compliance of the second gear while avoiding axial and radial compliance;
   a first drive element fixedly mounted to the second gear, the first drive element including an external bearing land and an inner hub, the inner hub receiving the compliant member; and
   a first bearing mounted to the external bearing land of the first drive element and a second bearing mounted in the inner hub of the first drive element, the first and second bearings enhancing alignment of the centerline axis and the rotational axis.

2. The steering device according to claim 1, further comprising: a second drive element shiftable relative to the second gear, the second drive element engaging the compliant member.

3. The steering device according to claim 2, wherein the inner hub of first drive element includes a plurality of recessed regions and the second drive element includes a plurality of lobe portions, each of the plurality of lobe portions nesting within a corresponding one of the plurality of recessed regions.

4. The steering device according to claim 3, wherein the compliant member includes a plurality of ear members, each of the plurality of ear members providing a resilient interface between a corresponding one of the plurality of lobe portions and respective recessed regions.

5. The steering device according to claim 2, further comprising: a shaft drivingly connected to the second gear, the second drive element being fixedly mounted to the shaft.

6. The steering device according to claim 1, wherein the first gear is a worm and the second gear is a worm gear.

7. The steering device according to claim 1, wherein the second gear is an enveloping worm gear.

8. An apparatus comprising:
   a worm having a centerline axis;
   a worm gear operatively connected to the worm, the worm gear having a rotational axis, the rotational axis being maintained substantially coplanar with the centerline axis, the worm gear including a compliant member, the compliant member allowing rotational compliance of the worm gear while avoiding axial and radial compliance that would impact alignment between the rotational axis and centerline axis;
   a first drive element fixedly mounted to the worm gear, the first drive element receiving the compliant member; and
   a first bearing mounted to the external bearing land of the first drive element and a second bearing mounted in the inner hub of the first drive element, the first and second bearings enhancing alignment of the centerline axis and the rotational axis.

9. The apparatus according to claim 8, further comprising: a second drive element shiftable relative to the worm gear, the second drive element engaging the compliant member.

10. The apparatus according to claim 9, wherein the first drive element includes a plurality of recessed regions and the second drive element includes a plurality of lobe portions, each of the plurality of lobe portions nesting within a corresponding one of the plurality of recessed regions.

11. The steering device according to claim 10, wherein the compliant member includes a plurality of ear members, each of the plurality of ear members providing a resilient interface between a corresponding one of the plurality of lobe portions and respective recessed regions.

12. The steering device according to claim 9, further comprising: a shaft drivingly connected to the second gear, the second drive element being fixedly mounted to the shaft.

13. The apparatus according to claim 12, wherein the compliant member operatively connects the shaft and the worm gear through the first drive member.

14. The apparatus according to claim 8, wherein the worm gear is an enveloping worm gear.

15. An apparatus comprising:
a worm gear including a compliant member that allows rotational compliance of the worm gear while avoiding axial and radial compliance;
a first drive element fixedly mounted to the worm gear, the first drive element including an external bearing land and an inner hub, the inner hub receiving the compliant member;
a first bearing mounted to the external bearing land of the first drive element; and
a second bearing mounted in the inner hub of the first drive element, the first and second bearings enhancing alignment of the centerline axis and the rotational axis.

16. The apparatus according to claim 15, further comprising: a second drive element shiftable relative to the worm gear, the second drive element engaging the compliant member.

* * * * *